United States Patent
Nord et al.

(10) Patent No.: US 8,647,091 B2
(45) Date of Patent: Feb. 11, 2014

(54) STATOR COMPACTED IN ONE PIECE

(75) Inventors: Göran Nord, Helsingborg (SE); Lars-Olov Pennander, Helsingborg (SE); Alan G. Jack, Hexham (GB)

(73) Assignee: Hoganas AB (Publ), Hoganas (SE)

( * ) Notice: Subject to any disclaimer, the term of this patent is extended or adjusted under 35 U.S.C. 154(b) by 428 days.

(21) Appl. No.: 12/921,971

(22) PCT Filed: Mar. 18, 2009

(86) PCT No.: PCT/SE2009/050274
§ 371 (c)(1),
(2), (4) Date: Oct. 21, 2010

(87) PCT Pub. No.: WO2009/116936
PCT Pub. Date: Sep. 24, 2009

(65) Prior Publication Data
US 2011/0025141 A1    Feb. 3, 2011

Related U.S. Application Data

(60) Provisional application No. 61/064,834, filed on Mar. 28, 2008.

(30) Foreign Application Priority Data

Mar. 19, 2008 (DK) .................................. 2008 00433

(51) Int. Cl.
*B29C 43/02* (2006.01)
*B29C 43/42* (2006.01)
(52) U.S. Cl.
USPC .............................. 425/78; 425/193; 425/355

(58) Field of Classification Search
USPC .................... 425/78, 193, 195, 435, 352–356
See application file for complete search history.

(56) References Cited

U.S. PATENT DOCUMENTS

| 7,156,631 B2 * | 1/2007 | Ozeki ............................. 425/78 |
| 7,538,467 B2 * | 5/2009 | Engquist et al. ....... 310/216.004 |
| 2004/0247728 A1 | 12/2004 | Ozeki |
| 2007/0278891 A1 | 12/2007 | Engquist et al. |
| 2009/0243406 A1 | 10/2009 | Jack et al. |

FOREIGN PATENT DOCUMENTS

| CN | 10109807 A | 1/2008 |
| DE | 1 584 381 A1 | 1/1970 |
| EP | 1 440 790 A1 | 7/2004 |
| WO | WO 03/013768 A1 | 2/2003 |
| WO | WO 2007/024184 A1 | 3/2007 |

OTHER PUBLICATIONS

International Search Report (PCT/ISA/210) dated Mar. 19, 2008.

(Continued)

*Primary Examiner* — Joseph S Del Sole
*Assistant Examiner* — Thukhanh Nguyen
(74) *Attorney, Agent, or Firm* — Buchanan Ingersoll & Rooney

(57) ABSTRACT

A compaction tool is provided for compacting an element from metal powder where the element has uniform axially displaced protrusions, and the tool comprises a die and a top and a bottom punch with punch surfaces. The top and bottom punch comprises displaceable opposing punch surfaces for displacing the metal powder there between before compacting the element. Additionally provided are a method for compacting an element from metal powder and an element made from such a method.

12 Claims, 7 Drawing Sheets

(56) References Cited

OTHER PUBLICATIONS

Written Opinion of The International Searching Authority (PCT/ISA/237) dated Mar. 19, 2008.

Official Action issued by Chinese Patent Office on Mar. 5, 2013 in Chinese Application No. 200980109736.X, and English language translation of Official Action (11 pgs).

* cited by examiner

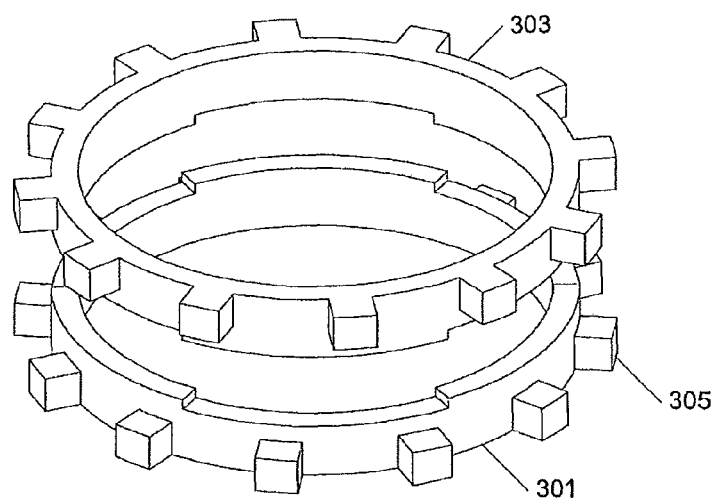
Fig. 3 (prior art)
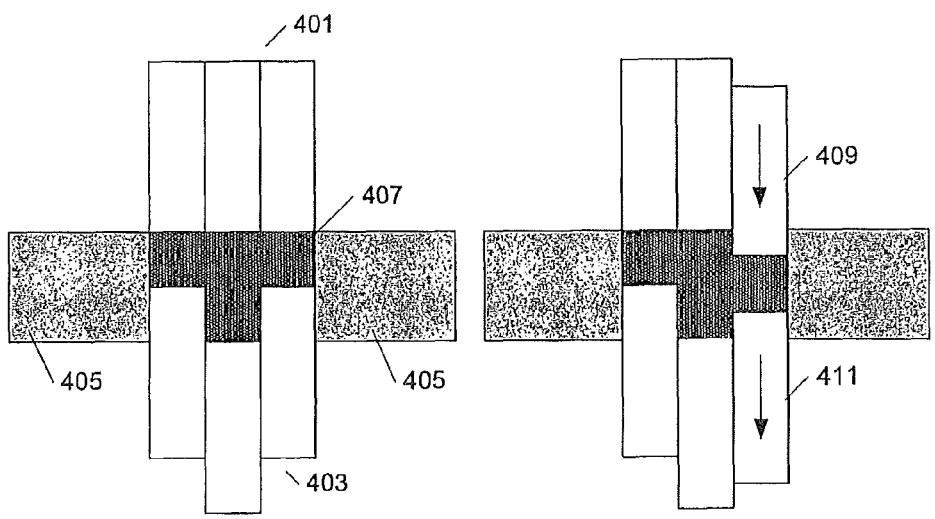
Fig. 4a                    Fig. 4b

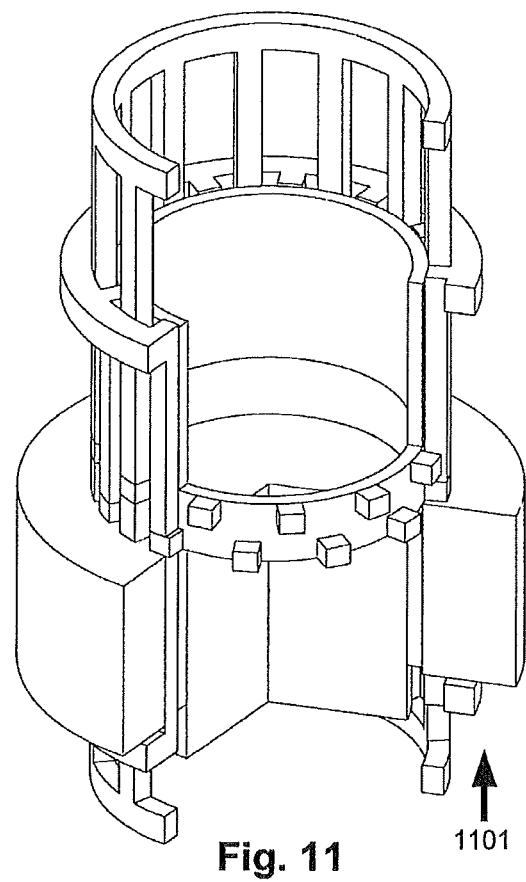
Fig. 11    1101
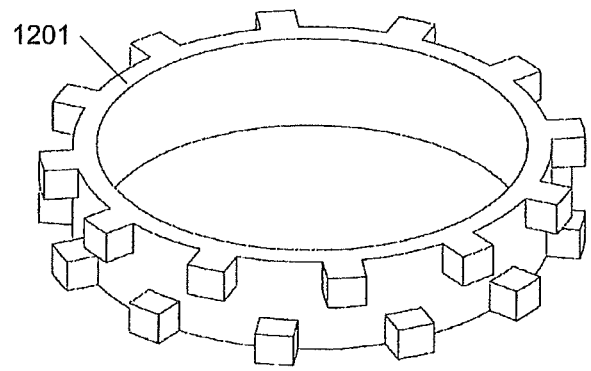
Fig. 12

STATOR COMPACTED IN ONE PIECE

FIELD OF THE INVENTION

This invention relates to a compaction tool, a method for compacting an element from metal powder and an element made from such a method.

BACKGROUND OF THE INVENTION

This invention relates to the design and efficient industrial manufacturing of soft magnetic core components for an electric modulated pole machine by use of a powder forming process. An efficient routine to manufacture such a structure may be the use of a soft magnetic composite (SMC) material that is based on soft magnetic powder particles that are compacted and deformed in a tool to create a component at relatively high density and including an electrically resistive property of the particles that will reduce the eddy-currents in the material and bring final component properties comparable to electrical steel sheets measured in their most desired direction and using alternating field (AC) magnetisation. Each SMC component can be formed with the described routine into a complex geometrical structure that will enable significant reduction of the number of individual components required to form the desired mono polar machine core.

When designing an electric modulated pole machine for industrial manufacturing there is a known general problem to manufacture the required quite complex soft magnetic components in an efficient way. More specifically the problem is connected to the number of and the complexity of each soft magnetic component that is required to establish an efficient magnetic flux path and a minimal magnetic circuit reluctance that will maximise the specific performance of the machine. The effective flux path must, in the here described machine, be carried by the soft magnetic components in all three geometrical space dimensions. The core material is traditionally a stack of laminated electric steel that is characterised by its high permeability in the plane of each lamina and with a significantly lower permeability in the direction transverse to this plane caused by the interrupts of the soft magnetic steel by the insulation in-between these steel sheets.

These circumstances require e.g. bending of the steel sheet stack to bring an efficient flux path in all three geometrical space dimensions. Another solution may be to divide the soft magnetic core into several sections that could be assembled to form the desired structure. The described state of art techniques do suffer from the drawback of in-efficient manufacturing and handling of a significant number of individual components including the forming and arrangement of the in many cases high number of individual steel sheet laminas.

One known efficient routine is to split the stator core into two or more mostly circular components that are made of soft magnetic powder metal and separately compacted to shape in a press tool. The minimum of two stator sections are then joined in a second operation to form the desired shape of the desired stator core.

SUMMARY

Embodiments of the invention described herein solve at least some of the above mentioned problems and provide an improved stator and method of producing such.

This may be obtained by a compaction tool for compacting an element from metal powder where said element has uniform, axially displaced protrusions, said tool comprises a die and a top and a bottom punch with punch surfaces. The top and bottom punch comprises respective displaceable opposing punch surfaces for displacing the metal powder there between before compacting the element.

Thereby elements with axially displaced protrusions such as a complete stator core section can be formed in one single process. Thereby the number of individual components to form the soft magnetic stator section is reduced, improving the stator and its magnetic properties and further the effort and required time to produce a stator is reduced.

In an embodiment the tool is for compacting a stator to be used in a rotating machine.

In an embodiment respectively the top and the bottom part of said tool comprises a first and a second punch part where the parts and thereby their punch surfaces can be relatively displaced. This is a specific simple way of implementing an embodiment of the present invention.

In an embodiment the tool is for compacting soft magnetic material such as soft magnetic powder.

The invention further relates to a method for compacting an element from metal powder in a compaction tool where said element has uniform and at least one axially displaced protrusion, i.e. the element has a plurality of like protrusions at least one of which is axially displaced relative to another one of the protrusions. After filling of a filling cavity in said compaction tool, the element is formed with axially aligned protrusions, i.e. with axially aligned powder volumes corresponding to the respective protrusions, wherein said at least one of said protrusions are axially displaced after filling and before compacting said element. Here and in the following the term axial refers to a direction along the axis of compaction. The protrusions may protrude in a direction transverse, e.g. normal, to the direction of compaction. In the context of the present description, references to the protrusions or other features of the element before compaction refer to the corresponding powder volume representing the protrusion or other feature. Hence axial displacement of the protrusions after filling and before compacting said element refers to an axial displacement of the powder volumes corresponding to the respective protrusions.

The method could e.g. be used for compacting the stator part of a rotating machine, where said stator comprises protrusions in the form of uniform stator teeth with two groups of axially displaced stator teeth.

Further the invention relates to an element made from compacted metal powder according to the method, wherein said element is a stator with axially displaced stator teeth to be used as part of a rotating machine. This element has better magnetic properties than prior art stators because it is moulded in one piece.

BRIEF DESCRIPTION OF THE DRAWINGS

In the following, preferred embodiments of the invention will be described referring to the figures, where
FIG. 3 illustrates a prior art stator,
FIGS. 4a and 4b illustrates the principle of an embodiment of the present invention,
FIG. 11 illustrates the compacted stator after ejection,
FIG. 12 illustrates the compacted stator.

DESCRIPTION OF EMBODIMENTS

Figure 1:
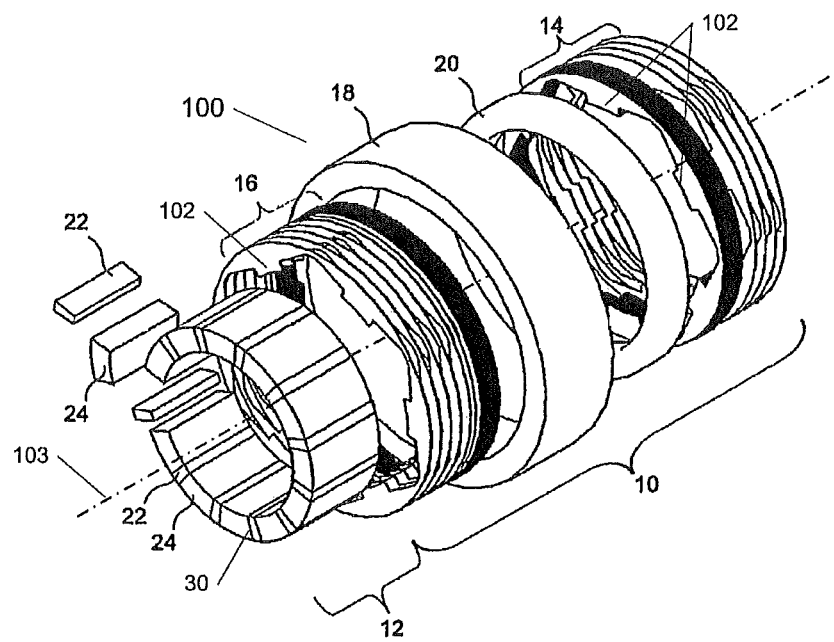
FIG. 1 illustrates the principle of the compaction method according to an embodiment of the present invention.

This invention relates to the field of an electric modulated pole machine 100 of which one example is shown in FIG. 1 in a schematic, exploded, perspective view. The electric modulated pole machine stator 10 is basically characterized by the use of a central single winding 20 that will magnetically feed multiple teeth 102 formed by the soft magnetic core structure. The stator core is then formed around the winding 20 while for other common electrical machine structures the winding is formed around the individual tooth core section. Examples of the modulated pole machine topology are sometimes recognised as e.g. Claw-pole-, Crow-feet-, Lundell- or TFM-machines. More particularly the shown electric modulated pole machine 100 comprises two stator core sections 14, 16 each including a plurality of teeth 102 and being substantially circular, a coil 20 arranged between the first and second circular stator core sections, and a rotor 30 including a plurality of permanent magnets 22. Further, the stator core sections 14, 16, the coil 20 and the rotor 30 are encircling a common geometric axis 103, and the plurality of teeth of the two stator core sections 14, 16 are arranged to protrude towards the rotor 30 for forming a closed circuit flux path. The machine in FIG. 1 is of the radial air gap flux outer rotor type as the stator teeth protrudes in a radial direction towards the rotor in this case with the stator surrounding the rotor.

However, the stator could equally well be placed interiorly with respect to the rotor which type is also illustrated in some of the following figures. The scope of invention as presented in the following is not restricted to any specific type of electric modulated pole machine and can equally well be applied to machines of both the axial and the radial type and for both interiorly and exteriorly placed stators relative to the rotor. Similarly, the invention is not restricted to single phase machines but can equally well be applied to multi phase machines.

The active rotor structure 30 is built up from an even number of segments 22, 24 whereas half the numbers of segments also called pole sections 24 are made of soft magnetic material and the other half of number of segments of permanent magnet material 22. The state of art method is to produce these segments as individual components. Often the number of segments can be rather large typically of order 10-50 individual pieces. The permanent magnets 22 are arranged so that the magnetization directions of the permanent magnets are substantially circumferential, i.e. the north and the south pole, respectively, is facing in a substantially circumferential direction. Further, every second permanent magnet 22, counted circumferentially is arranged having its magnetization direction in the opposite direction in relation to the other permanent magnets. The magnetic functionality of the soft magnetic pole pieces 24 in the desired machine structure is fully three dimensional and it is required that the soft magnetic pole piece 24 is able to efficiently carry magnetic flux with high magnetic permeability in all three space directions. A traditional design using laminated steel sheets will not show the required high permeability in the direction perpendicular to the plane of the steel sheets and it is here beneficial to use a soft magnetic structure and material that shows a higher magnetic flux isotropy than a state of the art laminated steel sheet structure.

Figure 2:
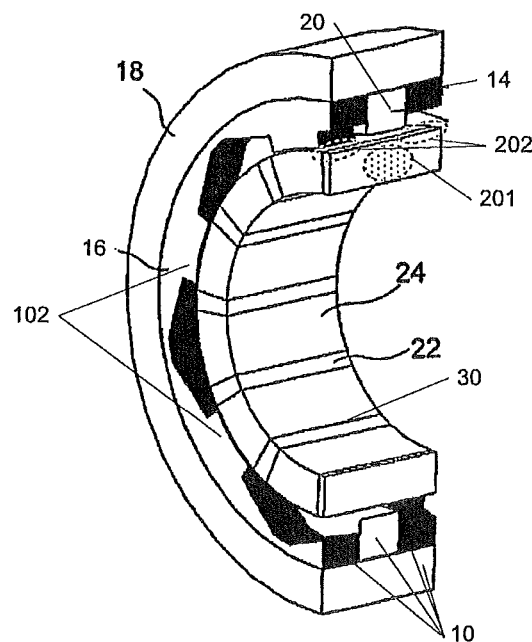
FIG. 2 is a schematic, exploded, perspective view of a state of the art radial air gap flux electric modulated pole machine and prior art rotor/stator design.

FIG. 2 shows the same radial electric modulated pole machine as from FIG. 1 but in a cross-sectional view of the assembled machine showing more clearly how the stator teeth 102 extend towards the rotor and how the stator teeth of the two stator core sections 14, 16 are rotationally displaced in relation to each other.

FIG. 3 illustrates a prior art stator being compacted in two identical stator sections 301, 303, where each stator section comprises a number of teeth 305. Each piece is made of soft magnetic powder metal and separately compacted to shape in a press tool. The two stator sections are then joined in a second operation to form the desired shape of the desired stator core with radially and axially displaced stator teeth.

FIGS. 4a and 4b illustrates the principle of an embodiment of the present invention, in FIG. 4a a top punch 401, a bottom punch 403 and a die 405 is illustrated. Metal powder is positioned inside the cavity between the punch surfaces of the top punch 401 and the bottom punch 403 for forming an element. Before punching the powder a part of the top and bottom punch 409, 411 is displaced for displacing the metal powder there between 413. After displacing, the relative position of the punches is locked before the element is compacted.

Figure 5:
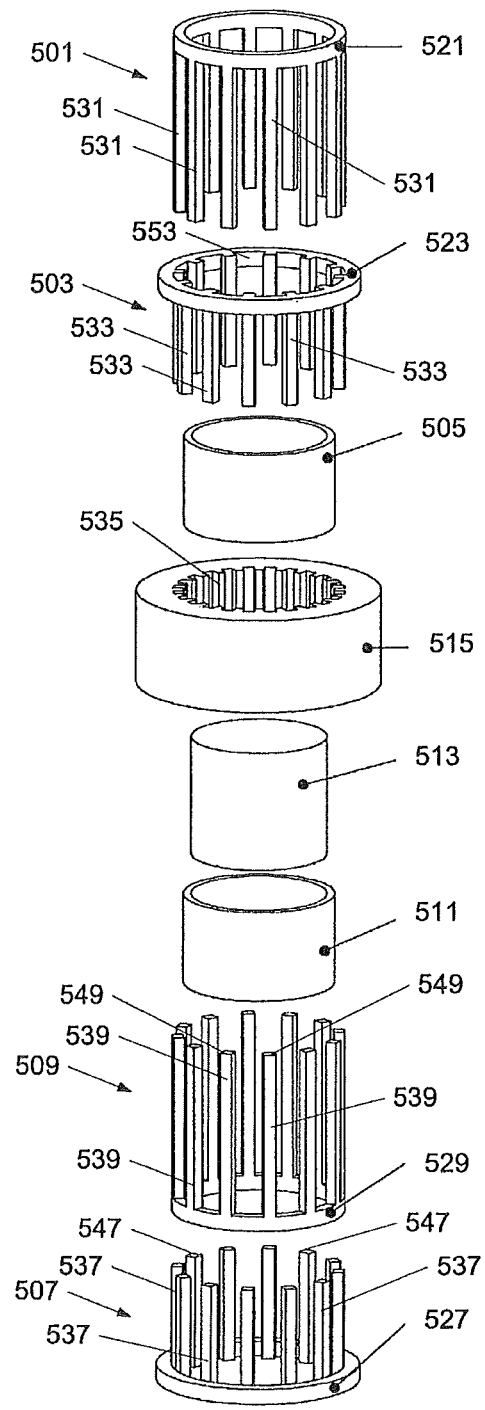
FIG. 5 illustrates the tool components of a tool compactor according to an embodiment of the present invention.

FIG. 5 illustrates the tool components of a tool compactor according to an embodiment of the present invention. The tool comprises two individually displaceable top punches 501 and 503 for punching the tooth and a top punch 505. The displaceable top and bottom punches are used for displacing and punching the teeth in the stator. Similarly the tool comprises two individually displaceable bottom punches 507 and 509 and a bottom punch 511. The tool further comprises a core rod 513 and a die 515. Each of the punches 501, 503, 507, and 509 comprises a plurality of axially extending punch members, e.g. punch members 531 of punch 501 and punch members 533 of punch 503, that are arranged parallel with each other and with the axial direction of the tool defined by the direction of compaction. The punch members 531 and 533 protrude axially from an annular base part 521 and 523, respectively, of the respective punch and are distributed around the annular base part so as to define a tubular shape. The punch members have respective punch surfaces defined by the end faces distal from the annular base part. The tubular shapes defined by all punches have the same inner diameter. The punch members 531 and 533 of the top punches 501 and 503, respectively, are distributed such that the top punches can be arranged relative to each other such that the punch members of both punches form a common tubular shape where the punch members of punch 501 and punch 503 are arranged in an alternating pattern around the circumference of the tubular shape, while the punch members of punch 501 and the punch members of punch 503 can be axially displaced relative to each other. In particular, each punch member 531 of punch 501 is located and can be displaced along a gap between two neighbouring punch members of punch 503. To this end, the annular base part 523 of punch 503 has an inner diameter no less than the outer diameter of the tubular shape defined by the punch members of punch 501. The punch members 533 of punch 503 are connected to and extend axially from the radially inward surface 553 of the annular base part 523 of punch 503. Hence the top punches 501 and 503 provide two sets of punch surfaces each arranged in a ring-shaped pattern where the punch surfaces of punch 501 alternate with the punch surfaces of punch 503 along the circumference of the ring. The punch surfaces are oriented with their normals along the axial direction and the punch surfaces of punch 501 can be axially displaced relative to the punch surfaces of punch 503. The bottom punches 507 and 509 are shaped similarly to the corresponding top punches, i.e. they have punch members 537 and 539, respectively, providing punch surfaces 547 and 549, respectively and axially extending from respective annular base parts 527 and 529. Punches 505 and 506 have a tubular shape. The die 515 has a tubular shape where the inner surface of the tube comprises axially extending geometrical features 535 corresponding to the protrusions and of a number and size such that the tubular punches 501, 503, 507, and 509 can be axially inserted into the die, such that the punch members glide inside the corresponding geometrical features of the die.

Figures 6, 7:
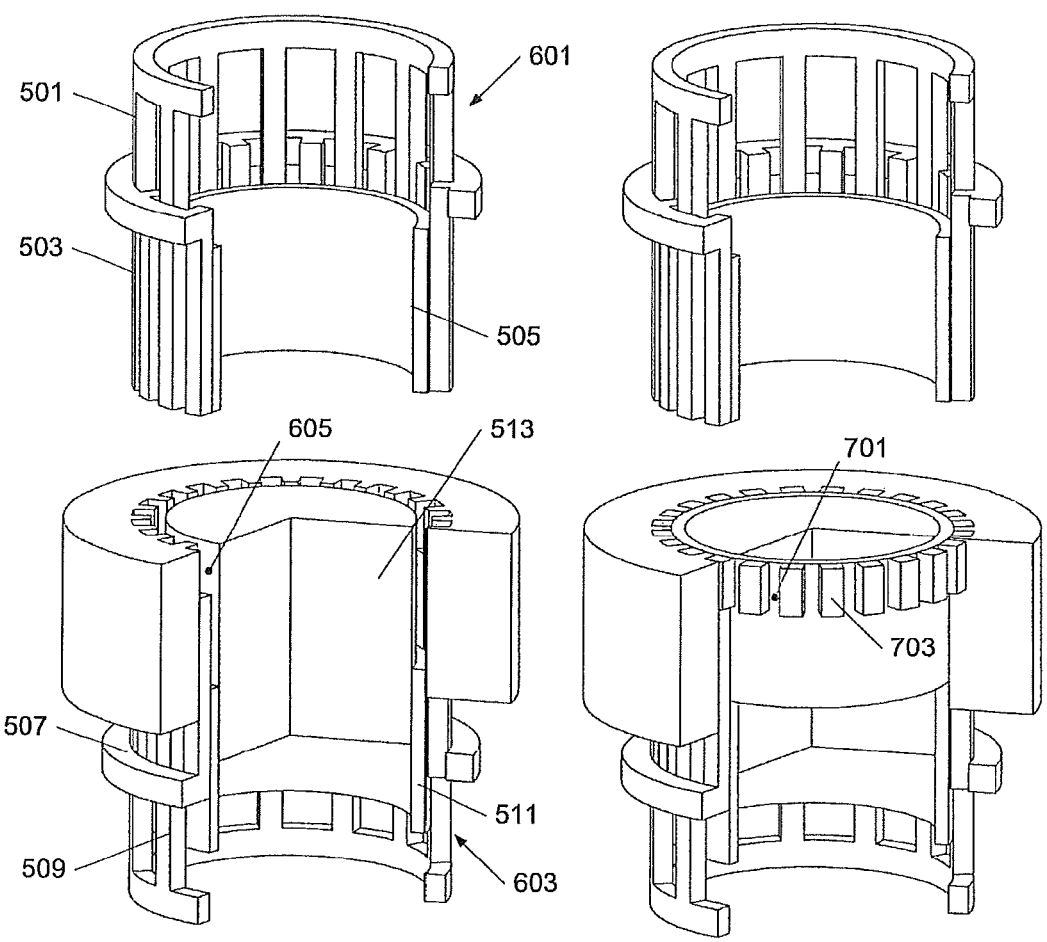
FIG. 6 illustrates the tool in a filling position.
FIG. 7 illustrates the tool with filled cavities.

FIG. 6 illustrates the tool in a filling position. The tool parts illustrated in FIG. 5 have been collected to a top part 601 and a bottom part 603. The top part comprises the top punches 501, 503 and 505 and the bottom part comprises the bottom punches 507, 509 and 511. The bottom part is between the die 515 and the core rod 513. A volume in the form of cavities 605 to be filled with metal powder is formed between the bottom part and the die and the core rod.

FIG. 7 illustrates the tool with filled cavities where powder 701 is shaped as the cavities in the tool where the teeth 703 all are aligned both radially and axially.

Figure 8:
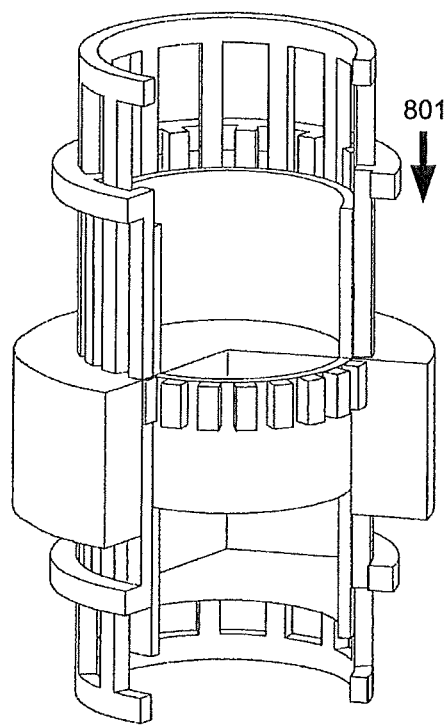
FIG. 8 illustrates the tool with a closed die.

FIG. 8 illustrates the tool with a closed die, where the top part has been moved down 801 on top of the die.

Figure 9A:
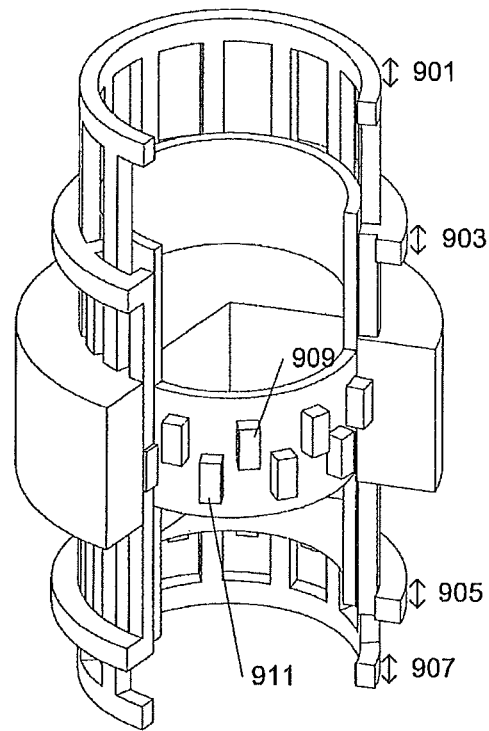
FIGS. 9a and 9b illustrates the shaped powder.
Figure 9B:
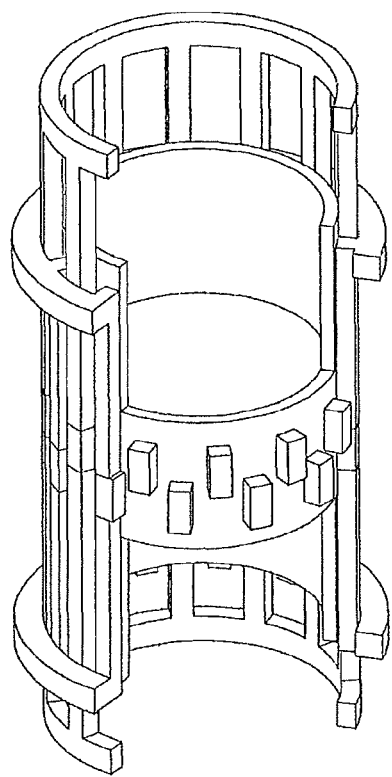

FIGS. 9*a* and 9*b* illustrates the shaped powder, here the two top punches 501 and 503 and the two bottom punches 507 and 509 are individually displaced as illustrated by the arrows 901, 903, 905 and 907. Thereby the teeth 909 and 911 are axially displaced whereby every second teeth being half of the teeth are axially displaced relative to the other half of the teeth. In FIG. 9*b* the die is not drawn to illustrate how the two top punches and the bottom punches axially displace the teeth relative to each other. In some embodiments, the powder volume is displaced before any compaction has taken place i.e. in entirely uncompacted condition. However, in some embodiments the powder may be displaced after a slight compaction has been performed, but before the final compaction.

Figure 10:
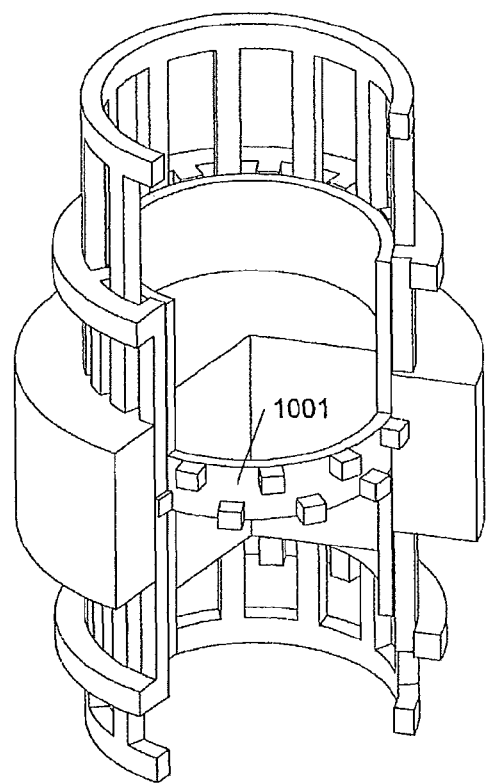
FIG. 10 illustrates the compacted stator.

FIG. 10 illustrates the compacted stator, where the top punches and the bottom punches fixed in the position illustrated in FIGS. 9*a* and 9*b* have been pressed together to compact the metal powder and thereby generate the stator element 1001.

FIG. 11 illustrates the compacted stator after ejection, where the stator is ejected out of the die by the bottom part of the tool in an upward direction 1101.

FIG. 12 illustrates the compacted stator 1201.

The stator could be compacted from metal powder being soft magnetic powder. The soft magnetic powder could be a substantially pure water atomised iron powder or a sponge iron powder having irregular shaped particles which have been coated with an electrical insulation. In this context the term "substantially pure" means that the powder should be substantially free from inclusions and that the amount of the impurities O, C and N should be kept at a minimum. The average particle sizes are generally below 300 μm and above 10 μm.

However, any soft magnetic metal powder or metal alloy powder may be used as long as the soft magnetic properties are sufficient and the powder is suitable for die compaction.

The electrical insulation of the powder particles may be made of an inorganic material. Especially suitable are the type of insulation disclosed in U.S. Pat. No. 6,348,265 (which is hereby incorporated by reference), which concerns particles of a base powder consisting of essentially pure iron having an insulating oxygen- and phosphorus-containing barrier. Powders having insulated particles are available as Somaloy®500, Somaloy®550 or Somaloy®700 available from Höganas AB, Sweden.

The invention claimed is:

1. A compaction tool for compacting an element from metal powder where said element has uniform axially displaced protrusions, said tool comprises a die and a top and a bottom punch with punch surfaces, wherein the top and bottom punch comprises displaceable opposing punch surfaces for displacing the metal powder there between before compacting the element,
   wherein the tool is adapted for compacting a stator to be used in a rotating electrical machine,
   wherein each of the top and the bottom punch of said tool comprises respective first and second punch parts each comprising a respective set of punch surfaces, where the first and second punch parts and thereby their respective sets of punch surfaces can be axially displaced relative to each other,
   wherein the first top punch part and the first bottom punch part form a first set, and the second top punch part and the second bottom punch part form a second set, wherein the punches of the first set are axially displaceable relative to the punches of the second set.

2. The compaction tool according to claim 1, wherein each of the first and second punch parts comprises a plurality of axially extending punch members each punch member comprising a punch surface, and the punch members being arranged coaxially.

3. The compaction tool according to claim 2, wherein each of the first and second punch parts comprises a respective annular base part to which the corresponding set of punch members are connected and from which the corresponding set of punch members axially protrude.

4. The compaction tool according to claim 1, wherein said tool is for compacting a soft magnetic powder.

5. The compaction tool according to claim 2, wherein said tool is for compacting a soft magnetic powder.

6. The compaction tool according to claim 3, wherein said tool is for compacting a soft magnetic powder.

7. The compaction tool according to claim 1, wherein the tool is adapted for compacting a stator that is ring shaped with radially and axially displaced protrusions.

8. The compaction tool according to claim 1, wherein the top punch comprises three parts, the first and second punch parts and a tubular punch, wherein the bottom punch comprises three parts, the first and second punch parts and a tubular punch, wherein the first and second punch parts punch the protrusions, and the tubular punches punch a body of the stator.

9. The compaction tool according to claim 1, wherein the die has a tubular shape with an inner surface, the inner surface comprising axially extending geometrical features corresponding to the protrusions, such that the first top and bottom punch parts can axially displace inside the geometrical features.

10. The compaction tool according to claim 1, wherein the first and second top punch parts are each tubular shaped, and wherein the first and second bottom punch parts are each tubular shaped.

11. The compaction tool according to claim 1, wherein the first and second top punch parts provide two sets of punch surfaces each arranged in a ring-shaped pattern where the punch surfaces of the first top punch part alternate with the punch surfaces of the second top punch part along the circumference of the ring-shaped pattern.

12. The compaction tool according to claim 1, wherein the tool is adapted for compacting a stator that is ring shaped with radially and axially displaced protrusions, wherein the top punch comprises three parts, the first and second punch parts and a tubular punch, wherein the bottom punch comprises three parts, the first and second punch parts and a tubular punch, wherein the first and second punch parts punch the protrusions, and the tubular punches punch a body of the stator, wherein the die has a tubular shape with an inner surface, the inner surface comprising axially extending geometrical features corresponding to the protrusions, such that the first top and bottom punch parts can axially displace inside the geometrical features, wherein the first and second top punch parts are each tubular shaped, and wherein the first and second bottom punch parts are each tubular shaped, wherein the first and second top punch parts provide two sets of punch surfaces each arranged in a ring-shaped pattern where the punch surfaces of the first top punch part alternate with the punch surfaces of the second top punch part along the circumference of the ring-shaped pattern.

\* \* \* \* \*